United States Patent
Muniere et al.

(10) Patent No.: US 8,577,342 B2
(45) Date of Patent: Nov. 5, 2013

(54) METHOD FOR ACQUIRING SYSTEM INFORMATION BY A MOBILE STATION IN A MOBILE RADIOCOMMUNICATION SYSTEM

(75) Inventors: Vincent Muniere, Meudon (FR); Stanislas Bourdeaut, Paris (FR)

(73) Assignee: Alcatel Lucent, Paris (FR)

(*) Notice: Subject to any disclaimer, the term of this patent is extended or adjusted under 35 U.S.C. 154(b) by 1019 days.

(21) Appl. No.: 11/836,100

(22) Filed: Aug. 8, 2007

(65) Prior Publication Data

US 2008/0039083 A1 Feb. 14, 2008

(30) Foreign Application Priority Data

Aug. 9, 2006 (EP) ..................... 06291293

(51) Int. Cl.
*H04M 3/42* (2006.01)

(52) U.S. Cl.
USPC ...................................... 455/414.1

(58) Field of Classification Search
USPC ......... 455/1, 63, 422.1, 560, 432.1, 403, 517, 455/525, 435.1, 432.3, 446, 452.2, 412.2, 455/434; 370/469, 300, 328, 208, 312, 311, 370/230, 332, 331
See application file for complete search history.

(56) References Cited

U.S. PATENT DOCUMENTS

| | | | |
|---|---|---|---|
| 6,874,113 B2 | 3/2005 | Chao et al. | |
| 2005/0009559 A1* | 1/2005 | Park et al. | 455/552.1 |
| 2005/0101245 A1* | 5/2005 | Ahmavaara | 455/1 |
| 2005/0177623 A1* | 8/2005 | Roberts et al. | 709/213 |
| 2006/0135174 A1* | 6/2006 | Kraufvelin et al. | 455/456.1 |
| 2006/0234702 A1* | 10/2006 | Wiberg et al. | 455/432.3 |
| 2006/0281456 A1* | 12/2006 | Roberts et al. | 455/434 |
| 2007/0049344 A1* | 3/2007 | Van Der Velde et al. | 455/560 |

FOREIGN PATENT DOCUMENTS

| | | |
|---|---|---|
| EP | 1032236 A1 | 8/2000 |
| EP | 1686827 A1 | 8/2006 |
| WO | WO 00/72609 A1 | 11/2000 |
| WO | WO 02/056616 A2 | 7/2002 |

OTHER PUBLICATIONS

H. Kaaranen, et al.: "UMTS Networks, Architecture, Mobility and Services" 2001, John Wiley & Sons, Ltd, XP002418774.

* cited by examiner

*Primary Examiner* — Kiet Doan
(74) *Attorney, Agent, or Firm* — Fay Sharpe, LLP

(57) ABSTRACT

One of the different objects of the present invention is The method for acquiring system information by a mobile station in a mobile radiocommunication system, including a step of: acquiring part of system information on or after access to the network for establishing or re-establishing a radio connection.

43 Claims, 3 Drawing Sheets

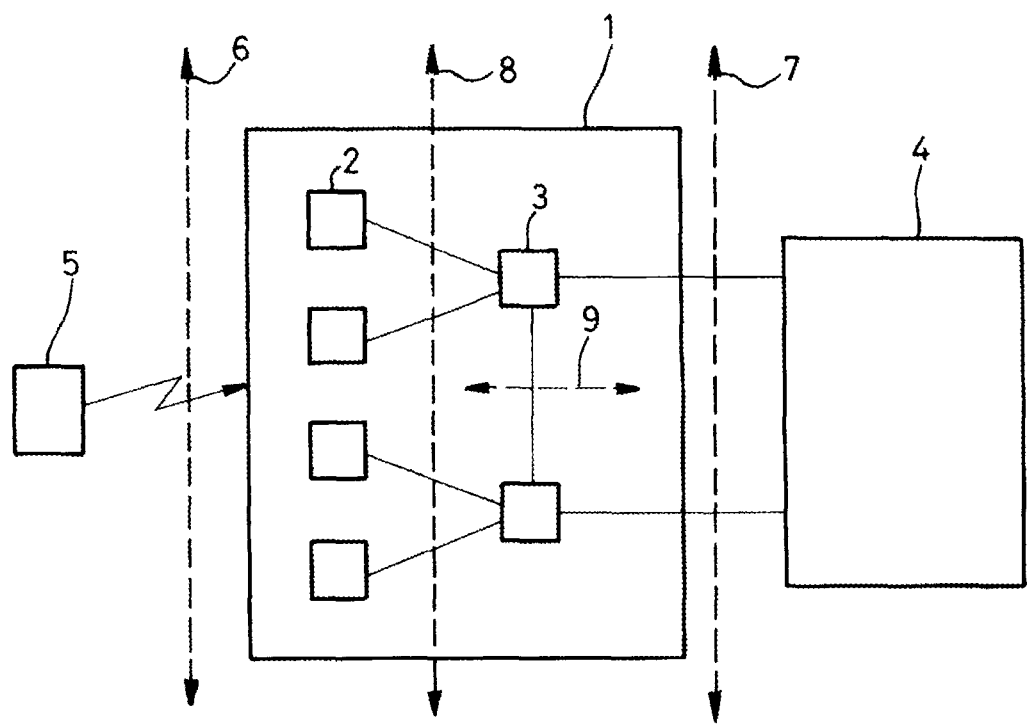
FIG_1

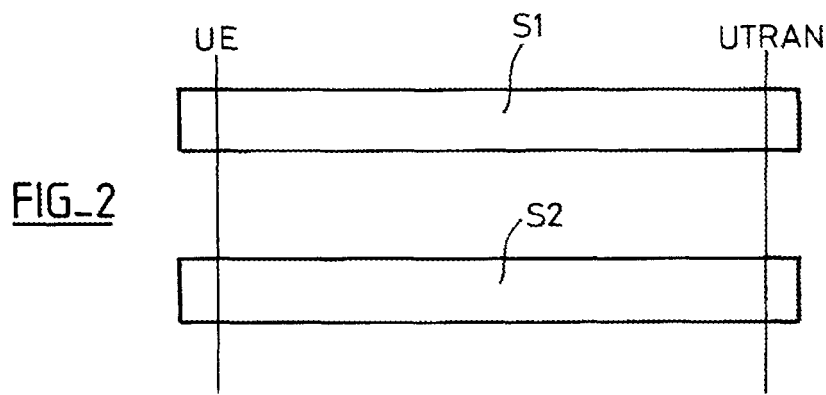
FIG_2
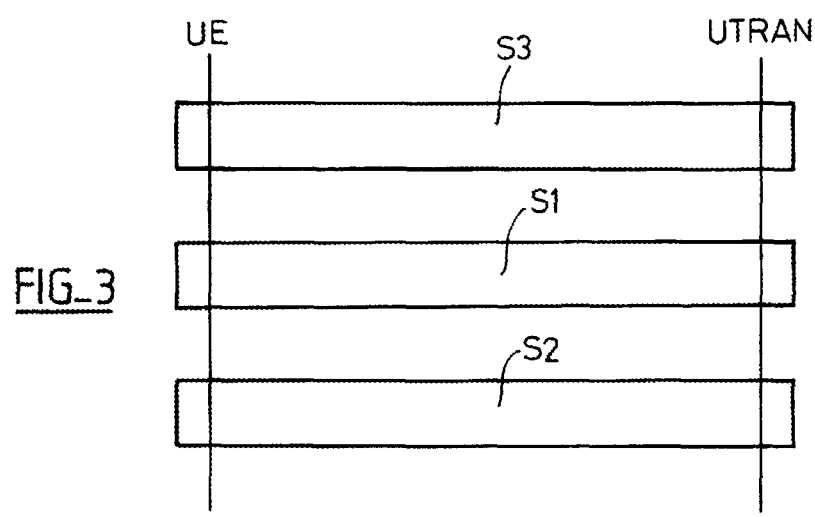
FIG_3
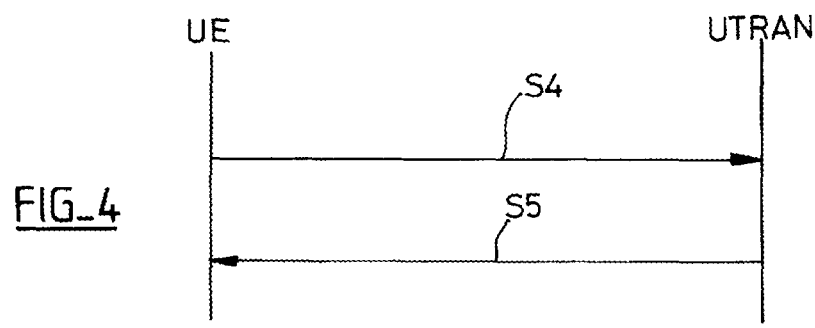
FIG_4

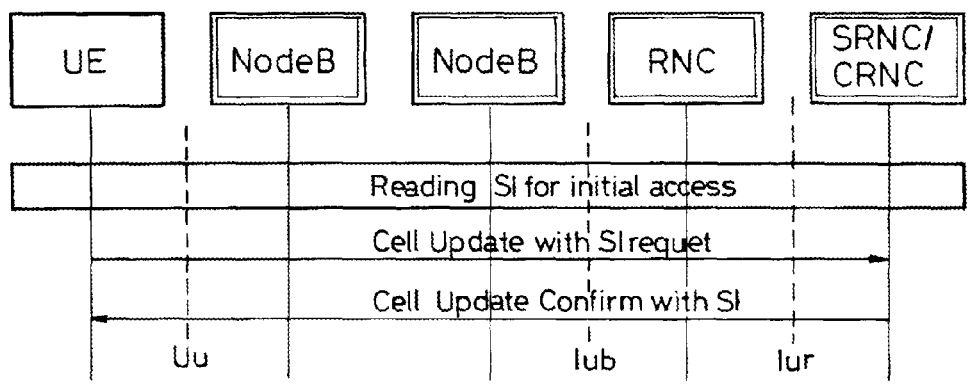
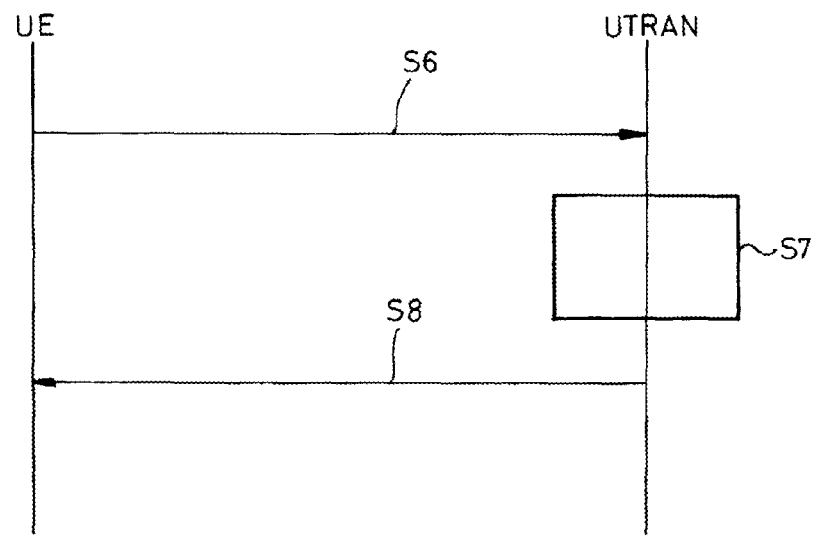

METHOD FOR ACQUIRING SYSTEM INFORMATION BY A MOBILE STATION IN A MOBILE RADIOCOMMUNICATION SYSTEM

CROSS-REFERENCE TO RELATED APPLICATIONS

This application is based on European Patent Application No. 06291293.6 filed Aug. 9, 2006, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication systems.

Detailed descriptions of mobile communication systems can be found in the literature, in particular in Technical Specifications published by standardisation bodies such as in particular 3GPP (3rd Generation Partnership Project).

2. Description of the Prior Art

It is simply recalled that the general architecture of a mobile communication system essentially comprises, as illustrated in FIG. 1:

a Radio Access Network 1, or RAN, a Core Network 4, or CN.

The RAN comprises network elements such as base stations 2 and base station controllers 3. The RAN is in relation, on the one hand with mobile stations 5, via an interface 6, and on the other hand with the CN via an interface 7. The CN is in relation with external networks (not illustrated specifically). Within the RAN, the base stations communicate with the base station controllers via an interface 8.

In systems of UMTS type, the RAN is called UTRAN (UMTS Terrestrial Radio Access Network), the base stations are called Node B, the base station controllers are called RNC (Radio Network Controller), and the mobile stations are called UE (User Equipment). The interface 6 is called Uu interface, the interface 7 is called Iu interface, the interface 8 is called Iub interface, and an interface 9 between RNCs, called Iur interface, is also introduced. The interface 6 is also called radio interface, and the interfaces 7, 8, 9, are also called terrestrial interfaces.

Now, there is an evolution of RAN (for example UTRAN) architecture towards an architecture called E-RAN (for example E-UTRAN). This evolution is also called Long Term Evolution. For example, the E-UTRAN comprises network elements such as base stations. The base stations are called e-Node B. The interface between e-Node Bs is called X2 and the interface between one e-Node B and the CN (or Access Gateway) is called S1.

In the following, UTRAN will more particularly be considered, as an example of RAN to which the present invention applies; however it should be understood that the present invention is not limited to this particular example.

UTRAN performs a number of functions, including RRC (Radio Resource Control) functions, as specified in particular in 3GPP TS 25.331.

Broadcasting of system information from UTRAN to UEs in a cell is specified in 3GPP TS 25.331. The system information elements are broadcast in System Information Blocks SIBs (SIBs currently specified being called SIB 1, ... SIB 18). A SIB groups together system information elements of the same nature. Different SIBs may have different characteristics, regarding their repetition rate and the requirements on UEs to re-read the SIBs. The system information is organised as a tree. A Master Information Block (MIB) gives references and scheduling information to a number of SIBs in a cell. The SIBs contain the actual system information.

A problem with such broadcasting of system information is the time it takes for a mobile station to acquire system information. This has a significant impact on the delays as perceived by the user, such as in particular the delays at call establishment, or cell reselection, or call re-establishment. Furthermore, the amount of system information is increasing, due in particular to technology evolutions, such as for example current deployment of new radio access technologies and/or current evolutions of Radio Access Network architecture, thereby still increasing such delays. This negatively affects user experience. Another problem is that such broadcasting of system information requires significant bandwidth, which does not correspond to efficient bandwidth use. Another problem is that such broadcasting of system information lacks flexibility, in particular the broadcast information cannot be optimised or adapted to each situation.

SUMMARY OF THE INVENTION

It is an object of the present invention to solve part or all of such problems and/or to avoid part or all of such drawbacks.

These and other objects are achieved, in one aspect of the present invention, by a method for acquiring system information by a mobile station in a mobile radiocommunication system, comprising a step of:

acquiring part of said system information on or after access to the network for establishing or re-establishing a radio connection.

In another aspect, part of system information which can be acquired on or after said access includes non access-related system information.

In another aspect, said method comprises a step of:

acquiring part of said system information before said access.

In another aspect, part of system information which should be acquired before said access includes access-related system information.

In another aspect, said method comprises the steps of:

the mobile station sending at least one request to the network for acquiring system information on or after said access, the network sending system information, upon reception of said request.

In another aspect, said access corresponds to initial access.

In another aspect, said method comprises a step of:

the network indicating which system information should be acquired before access, and/or which system information can be acquired on or after access.

In another aspect, said system information includes neighbour cell information, and said method comprises a step of:

the network indicating which neighbour cell information should be acquired before access, and/or which neighbour cell information can be acquired on or after access.

In another aspect, different types of neighbour cell information include intra-frequency cell information, inter-frequency cell information, and inter-radio access technology cell information, and said method comprises a step of:

the network indicating neighbour cell information type or types which should be acquired before access, and/or neighbour cell information type or types which can be acquired on or after access.

In another aspect, said method comprises a step of:

the network providing said indication in broadcast system information.

In another aspect, said method comprises a step of:
the network providing said indication in a Master Information Block.

In another aspect, said method comprises a step of:
the network providing said indication in a System Information Block to be read by mobile stations before access.

In another aspect, said method comprises a step of:
the mobile station sending said request in at least one message sent according to Radio Resource Control protocol.

In another aspect, said method comprises a step of:
the mobile station sending said request in at least one message chosen in a group comprising:
Cell Update message,
Cell Update Complete message,
RRC Connection Request message,
RRC Connection Set-up complete message,
Measurement Report message,
UTRAN Mobility Information Confirm message,
Uplink Direct Transfer message,
Physical Channel Reconfiguration Complete message,
Dedicated message indicating a System Information Request.

In another aspect, said method comprises a step of:
the network sending system information which can be acquired on or after access, in a dedicated channel.

In another aspect, said method comprises a step of:
the network sending system information which can be acquired on or after access, in at least one message sent according to Radio Resource Control protocol.

In another aspect, said method comprises a step of:
the network sending system information which can be acquired on or after access, in at least one message chosen in a group comprising:
Cell Update Confirm message,
RRC Connection Set-up message,
UTRAN Mobility Information message,
Measurement Control message,
Downlink Direct Transfer message.

In another aspect, said method comprises a step of:
the network adapting system information which can be acquired on or after access, as a function of mobile station or user requirements and/or system requirements.

In another aspect, said method comprises a step of:
the network adapting system information which can be acquired on or after access, as a function of radio access capabilities of said mobile station.

In another aspect, said method comprises a step of:
the network adapting system information which can be acquired on or after access, as a function of the on-going services or Quality of Service for the user.

In another aspect, said method comprises a step of:
the network adapting system information which can be acquired on or after access, as a function of information received from said mobile station.

In another aspect, said method comprises a step of:
the network adapting system information which can be acquired on or after access, as a function of information received from said mobile station in a request for acquiring system information on or after access.

In another aspect, said method comprises a step of:
the mobile station sending to the network information enabling the network to adapt system information which can be acquired on or after access.

In another aspect, said method comprises a step of:
the mobile station sending to the network information enabling the network to adapt system information which can be acquired on or after access, in a request for acquiring system information on or after access.

In another aspect, said method comprises a step of:
the network adapting system information which can be acquired on or after access, as a function of system load.

In another aspect, adapted system information comprises neighbour cell information.

In another aspect, said method comprises a step of:
the mobile station acquiring system information which should be acquired before access, from system information broadcast by said network.

In another aspect, said method comprises a step of:
the mobile station acquiring system information which can be acquired on or after access, from system information broadcast by said network.

These and other objects are achieved, in another aspect of the present invention, by a mobile station comprising means for performing a method according to the present invention.

These and other objects are achieved, in another aspect of the present invention, by a network entity, such as in particular Radio Network Controller (RNC) for UTRAN, comprising means for performing a method according to the present invention.

BRIEF DESCRIPTION OF THE DRAWINGS

These and other objects of the present invention will become more apparent from the following description taken in conjunction with the accompanying drawings:

FIG. 1 is intended to recall the architecture of a mobile communication system such as for example UMTS, and of a Radio Access Network such as for example UTRAN, FIGS. 2 to 6 are intended to illustrate examples of a method according to the present invention.

MORE DETAILED DESCRIPTION OF THE INVENTION

By way of example, UTRAN will more particularly be considered in the following description, as an example of RAN to which the present invention applies; however it should be understood that the present invention is not limited to this particular example.

The present invention may also be explained as follows, to simplify based on examples. In particular, the example of initial access for establishing (or re-establishing) a radio connection will be more particularly considered in the following; however it should be understood that the present invention is not limited to this example, and could be used in other examples such as access for establishing a radio connection in case of cell reselection for example.

Since new radio access technologies are being deployed, in one UTRAN cell, the number of neighbouring cells is increasing. Therefore system information corresponding to neighbour cell information (such as in particular in SIB 11) are increasing. If all the information would have to be read before the UE initial access, this initial access could be delayed, thus impacting the call set-up delay and affecting the user experience.

In one aspect, the present invention in particular recognizes that it would be beneficial to acquire part of system information on or after access, contrary to the prior art where all system information are acquired before access. This would enable to avoid such drawbacks.

In FIG. 2, a step of access by the mobile station to the network for establishing or re-establishing a radio connection is noted S1, and a step of acquiring system information on or after access is noted S2.

In another aspect, the present invention also recognizes that it would be beneficial to specify several system information categories, ones which should be read for initial access, and others which can be read later, in further step(s), by the UE.

In FIG. 3, a step of access by the mobile station to the network for establishing or re-establishing a radio connection is noted S1, a step of acquiring system information which should be read before access is noted S3, and a step of acquiring system information which can be acquired on or after access is noted S2.

In particular, system information which should be read before access may include access-related system information, and system information which can be read on or after access may include non access-related system information.

Access-related information may for example include information that are necessary for performing radio resource management and/or control procedures before establishment of a RRC connection (i.e. in idle mode). Non access-related information may for example include information that are necessary for performing radio resource management and/or control procedures on or after establishment of a RRC connection (i.e. in connected mode).

In another aspect, the present invention also recognizes that, since, after the initial access, a UE may have a connection with the radio access network (UTRAN, or E-UTRAN . . . ), the second step and subsequent system information acquisitions may be performed "on demand", thus allowing the radio access network to provide the UE with the needed system information, and only the ones which are needed, which saves downlink bandwidth and decrease the relevant information acquisition time.

Therefore, at call establishment or re-establishment, the UE should not waste time acquiring all system information, but should only acquire those which are useful for initial access. And remaining sets of SIBs would rather be acquired later, when the UE is in connected mode (for example in Cell_DCH state).

For instance, at RLC unrecoverable error, the UE may need to reselect another cell: then, it is useful for the UE to have acquired all the neighbourhood configuration sent in SIB 11 and SIB 12. Moreover a UE involved in location services, may need on assistance data information contained in SIB 15 and SIB 16.

In such examples, SIB 11, 12, 15 and 16 contain much information, and the UE would benefit to request the UTRAN to transmit system information, in connected mode (for example during Cell_DCH state), if they have not been acquired before the initial access.

The present invention also proposes to define several categories of system information in the UE, or in the radio access network or both. Access category (or access related) system information defines the information which should be acquired by the UE before initial access.

In another aspect, the present invention also proposes that several categories can be used among the system information describing the neighborhood. The neighborhood in particular includes different cells of same technology, or different cells of different frequencies or bands, or different technologies.

The UE can acquire the part of the neighborhood which is needed before initial access (this part may be null).

In another aspect, the present invention also proposes that the radio access network can indicate, for each part of the neighborhood, whether the UE should acquire it or if the UE can acquire it in a further step.

Such indication can be transmitted by the radio access network, for example in a Master Information Block, or in a system information block which shall be read by the UE before initial access.

Once initial access has been performed, the UE may acquire the remaining system information (either in one step or in several steps).

The UE may receive the remaining system information on a broadcast channel, or on a dedicated channel, e.g. a signaling radio bearer.

The present invention also proposes that when the information is received in connected mode (for example on a dedicated channel), the UE may request the needed system information to the radio access network.

In FIG. 4, a step of sending such request for acquiring system information is noted S4, and a step of sending system information to the mobile station upon such request is noted S5.

In an example, in order to allow the UE read part of System Information and acquire the remaining SIBs once the initial access has been performed, it is proposed to add signalling so that the UE may request some SIBs to be transmitted on DCCH once the UE is in Cell_DCH.

Such system information request would allow to speed up the initial call set-up, and re-entering of service after RLC unrecoverable errors. It contains the SIBs which are needed by the UE, and which have not been decoded so far.

The UE request of system information may be sent, for instance, in the Cell Update message, in the Cell Update Complete message, in the RRC Connection Request message, in a Measurement Report message, or in the UTRAN Mobility Information Confirm message, or piggy backed in the Uplink Direct Transfer message, or sent in a Physical Channel Reconfiguration Complete message, or in a dedicated message indicating a System Information Request.

The example of sending a request in the Cell Update message is illustrated in FIG. 5 where it is noted "Cell Update with SI request".

On receipt of this request, the radio access network should send to the UE the relevant system information.

This may be transmitted for example in the Cell Update Confirm message, or RRC Connection Set-up message, or UTRAN Mobility Information message, or in a Measurement Control message, or piggy backed in the downlink Direct Transfer message, or sent in the existing System Information Blocks: the different categories of neighbor cells and parameters could be split among new system information, or among existing system information with new instances.

The example of sending system information in the Cell Update Confirm message is illustrated in FIG. 5 where it is noted "Cell Update Confirm with SI".

In an example, on receipt of a request, the radio access network should send to the UE the relevant system information on DCCH once the UE is in Cell_DCH. Since DCCH may be carried on HS-DSCH, missing information may be transmitted very efficiently from UTRAN to the UE.

In other words, in the considered examples, due in particular to the extension of content of system information, it is therefore proposed to add signalling in 3GPP TS 25.331 in order to allow the UE to explicitly request for some System Information Blocks and to allow the UTRAN to send SIBs on DCCH.

In another aspect, the present invention also proposes that the UTRAN can benefit from information it already handles in order to optimize the System information sent in a dedicated mode to the UE.

In particular, the UTRAN may use the radio access capabilities of the UE in order to send information about the relevant neighborhood, for instance a UE supporting E-UTRA should be provided with information about E-UTRA neighboring cells.

The UTRAN may also base the information on the system load: for instance very loaded neighbor cells/frequencies/bands/technologies could be removed from the list of neighboring cells/frequencies/bands/technologies.

The UTRAN may also base the information on services: for instance some cells/frequencies/bands/technologies could be favoured (or forbidden) in the list of neighboring cells/frequencies/bands/technologies, if the user has activated a certain QoS.

In FIG. 6, such a step of adapting or optimising system information which can be acquired after access, as a function of mobile station or user requirements and/or system requirements, is noted S7, and a step of sending such adapted or optimised system information is noted S8. In addition, a step of sending to the network information enabling such adaptation or optimisation, in particular in a request for acquiring further system information, is noted S6.

The present invention also has for its object a mobile station, as well as a network entity (such as in particular Radio Network Controller (RNC) for UTRAN), comprising means for performing a method according to the present invention, according to any of the above described aspects, taken individually or in combination.

The detailed implementation of the above-mentioned means does not raise any special problem for a person skilled in the art, and therefore such means do not need to be more fully disclosed than has been made above, by their function, for a person skilled in the art.

The invention claimed is:

1. A method for acquiring system information by a mobile station in a Universal Mobile Telecommunications System (UMTS) mobile radio communication system, comprising a step of:
   a mobile station acquiring part of said system information on one of on access and after access to a network for one of establishing and re-establishing a radio connection with said network, wherein said part of said system information includes non access-related system information for performing at least one of radio resource management and control procedures on one of on establishment and after establishment of a Radio Resource Control (RRC) connection.

2. The method according to claim 1, comprising a step of: said mobile station acquiring part of said system information before access to said network.

3. The method according to claim 2, wherein said part of system information acquired before said access to said network includes access-related system information.

4. The method according to claim 1, comprising the steps of:
   the said mobile station sending at least one request to the said network for acquiring system information on one of on said access and after said access; and
   said network sending system information upon reception of said request.

5. The method according to claim 4, comprising a step of: said mobile station sending said at least one request in at least one message sent according to Radio Resource Control protocol.

6. The method according to claim 4, comprising a step of: said mobile station sending said at least one request in at least one message chosen in a group comprising:
   Cell Update message,
   Cell Update Complete message,
   RRC Connection Request message,
   RRC Connection Set-up complete message,
   Measurement Report message,
   UTRAN Mobility Information Confirm message,
   Uplink Direct Transfer message,
   Physical Channel Reconfiguration Complete message, and
   Dedicated message indicating a System Information Request.

7. The method according to claim 1, wherein said access corresponds to initial access.

8. The method according to claim 1, comprising a step of: said network indicating at least one of which system information should be acquired before access and which system information can be acquired on one of on access and after access to said network.

9. The method according to claim 8, comprising a step of: said network providing said indication in broadcast system information.

10. The method according to claim 9, comprising a step of: said network providing said indication in a Master Information Block.

11. The method according to claim 9, comprising a step of: said providing said indication in a System Information Block to be read by mobile stations before access.

12. The method according to claim 1, wherein said system information includes neighbor cell information, and said method comprises a step of:
    said network indicating at least one of which neighbor cell information should be acquired before access and which neighbor cell information can be acquired on one of on access and after access to said network.

13. The method according to claim 12, wherein different types of neighbor cell information include intra-frequency cell information, interfrequency cell information, and inter-radio access technology cell information, and said method comprises a step of:
    said network indicating at least one of neighbor cell information type which should be acquired before access and neighbor cell information type which can be acquired on one of on access and after access.

14. The method according to claim 1, comprising a step of: said network sending system information which can be acquired on one of on access and after access, wherein said sending is in a dedicated channel.

15. The method according to claim 1, comprising a step of: said network sending system information which can be acquired on one of on access and after access, wherein said sending is in at least one message sent according to Radio Resource Control protocol.

16. The method according to claim 1, comprising a step of: said network sending system information which can be acquired on one of on access and after access, wherein said sending is in at least one message chosen in a group comprising:
    Cell Update Confirm message,
    RRC Connection Set-up message,
    UTRAN Mobility Information message, Measurement Control message, and
Downlink Direct Transfer message.

17. The method according to claim 1, comprising a step of:
said network adapting system information which can be acquired on one of on access and after access, as a function of at least one of mobile station requirements and user requirements and system requirements.

18. The method according to claim 17, wherein said adapted system information comprises neighbor cell information.

19. The method according to claim 1, comprising a step of:
said network adapting system information which can be acquired on one of on access and after access, as a function of radio access capabilities of said mobile station.

20. The method according to claim 1, comprising a step of:
said network adapting system information which can be acquired on one of on access and after access, as a function of the on-going services or Quality of Service for the user.

21. The method according to claim 1, comprising a step of:
said network adapting system information which can be acquired on one of on access and after access, as a function of information received from said mobile station.

22. The method according to claim 1, comprising a step of:
said network adapting system information which can be acquired on one of on access and after access, as a function of information received from said mobile station in a request for acquiring system information on or after access.

23. The method according to claim 1, comprising a step of:
said mobile station sending to the network information enabling said network to adapt system information which can be acquired on one of on access and after access.

24. The method according to claim 1, comprising a step of:
said mobile station sending to said network information enabling said network to adapt system information which can be acquired on one of on access and after access, wherein said sending is in a request for acquiring system information on one of on access and after access.

25. The method according to claim 1, comprising a step of:
said network adapting system information which can be acquired on one of on access and after access, as a function of system load.

26. The method according to claim 1, comprising a step of:
said mobile station acquiring system information which should be acquired before access to said network from system information broadcast by said network.

27. The method according to claim 1, comprising a step of:
said mobile station acquiring system information which can be acquired on one of on access and after access from system information broadcast by said network.

28. The method of claim 1 wherein said system information is one or more System Information Blocks.

29. The method according to claim 1, wherein said network is a UMTS Terrestrial Radio Access Network (UTRAN).

30. The method according to claim 1, wherein said network is an Evolved UMTS Terrestrial Radio Access Network (E-UTRAN).

31. An apparatus, comprising:
a mobile station configured to acquire part of system information on one of on access and after access to a network in a Universal Mobile Telecommunications System (UMTS) mobile radio communication system for one of establishing and reestablishing a radio connection with said network, wherein said part of said system information includes non access-related system information for performing at least one of radio resource management and control procedures on one of on establishment and after establishment of a Radio Resource Control (RRC) connection.

32. The apparatus according to claim 31, comprising:
the mobile station configured to send at least one request to said network for acquiring system information on one of on access and after access to said network.

33. The apparatus according to claim 31, comprising:
the mobile station configured to send to said network information enabling said network to adapt system information which can be acquired on one of on access and after access to said network.

34. The mobile station according to claim 31, wherein said system information is one or more System Information Blocks.

35. The mobile station apparatus according to claim 31, wherein said network is a UMTS Terrestrial Radio Access Network (UTRAN).

36. The station apparatus according to claim 31, wherein said network is an Evolved UMTS Terrestrial Radio Access Network (E-UTRAN).

37. A network entity, comprising:
a radio network controller configured to enable a mobile station to acquire part of system information on one of on access and after access to a network in a Universal Mobile Telecommunications System (UMTS) mobile radio communication system for one of establishing and reestablishing a radio connection with said network, wherein said part of said system information includes non access-related system information for performing at least one of radio resource manaqement and control procedures on one of on establishment and after establishment of a Radio Resource Control (RRC) connection.

38. The network entity according to claim 37, comprising:
the radio network controller configured to send system information upon reception of a request from said mobile station.

39. The network entity according to claim 37, comprising:
the radio network controller configured to indicate at least one of which system information should be acquired before access to said network and which system information can be acquired on one of on access and after access to said network.

40. The network entity according to claim 37, comprising:
the radio network controller configured to adapt system information which can be acquired on one of on access and after access to said network, as a function of one of mobile station requirements and user requirements.

41. The network entity according to claim 37, wherein said system information is one or more System Information Blocks.

42. The network entity according to claim 37, wherein said network is a UMTS Terrestrial Radio Access Network (UTRAN).

43. The network entity according to claim 37, wherein said network is an Evolved UMTS Terrestrial Radio Access Network (E-UTRAN).

* * * * *